United States Patent Office 3,475,305
Patented Oct. 28, 1969

3,475,305
PROCESS FOR MANUFACTURE OF
ADIPONITRILE
Shigeru Wakamatsu and Shuntaro Hosaka, Nagoya, Japan, assignors to Toyo Rayon Kabushiki Kaisha, Tokyo, Japan, a corporation of Japan
No Drawing. Filed May 26, 1967, Ser. No. 641,498
Claims priority, application Japan, May 31, 1966, 41/34,492
Int. Cl. B01j 1/10
U.S. Cl. 204—158       7 Claims

ABSTRACT OF THE DISCLOSURE

Adiponitrile is prepared by reacting acrylonitrile and an iron carbonyl compound under irradiation containing a major portion of its energy in wavelengths between 2000 A. and 7000 A. and reacting the mixture with water, alcohols and/or phenols. The water, alcohols and/or phenols may be present in the reaction system from the start. According to this method, adiponitrile can be obtained at an excellent yield with an extremely small amount of by-products.

---

This invention relates to a process for the manufacture of adiponitrile by the hydrodimerisation of acrylonitrile, and more particularly to a process for the manufacture of adiponitrile, characterised by reacting acrylonitrile and an iron carbonyl compound under irradiation containing a major portion of its energy in wavelengths between 2000 A. and 7000 A. and reacting the mixture with at least one hydroxy compound selected from the group consisting of water, alcohols and phenols.

As a method of producing adiponitrile by hydrodimerisation of acrylonitrile, an electrolytic method, which is classified into an amalgam method and an electrochemical hydrodimerisation, has been known. There has also been known a method of producing adiponitrile by heating acrylonitrile together with a base and an iron carbonyl (French Patent No. 1,377,425), but according to this method, such by-products as propionitrile, ethylene cyanohydrin and a high polymer are formed in great quantities and the yield of adiponitrile is disadvantageously low.

The process of this invention makes it possible to obtain a very pure adiponitrile at good yields and without almost any formation of by-products by a simpler operation than the conventional one.

The process of this invention can be achieved by subjecting a mixture of acrylonitrile, an iron carbonyl compound and at least one hydroxy compound selected from the group consisting of water, alcohols and phenols to irradiation of light, or by subjecting a mixture of acrylonitrile and an iron carbonyl compound to irradiation of light and reacting the resulting mixture with at least one hydroxy group selected from the group consisting of water, alcohols and phenols.

The irradiation may be carried out either at ambient temperature or while heating to a temperature as high as about 150° C.

It is possible to subject a reaction mixture to irradiation at a temperature as low as 0° or at room temperature, and then to heat it to a temperature of 40 to 200° C.

A pressure vessel is used when it is necessary to heat the reaction mixture to a temperature above the boiling point.

If irradiation is carried out at a temperature as high as above 150° C. in operation under heating, a small amount of coloured substances adheres to the wall of a reaction vessel. This disadvantageously results in the decrease of a light transmission and conversion ratio.

Irradiation is an essential element of this invention. In Example 16 to be described later, there was not a trace of the formulation of adiponitrile when a reaction mixture consisting of acrylonitrile, an iron carbonyl compound and water was merely heated. It was found however that if the same mixture is subjected to irradiation at room temperature, adiponitrile is obtained at a good yield and without almost any formation of by-products. Heating after irradiation at room temperature is not necessarily essential, and the intended reaction proceeds sufficiently by a long time irradiation as can be seen from the results of Examples 1 to 10.

As the iron carbonyl compound usable in this invention, there are iron carbonyls such as $Fe(CO)_5$, $Fe_2(CO)_9$, $Fe_3(CO)_{12}$, a hydride such as $H_2Fe(CO)_4$, and an iron carbonyl derivative such as $(CH_2=CH—CH)_2Fe_2(O)_6$, $(CH_2=CH—CN)Fe(CO)_4$ and $(CH_2=CH—CH=CH_2)Fe(CO)_3$ among which $Fe(CO)_5$ is suitable because of ease of handling.

The alcohols to be used in this invention include primary, secondary and tertiary aliphatic alcohols such as methanol, ethanol, n-propanol, isopropanol, n-butanol, sec-butanol and tert.-butanol, alicyclic alcohols such as cyclohexanol, cyclooctanol and cyclododecanol, aralkanols such as benzylalcohol, unsaturated alcohols such as allyl alcohols, crotyl alcohol and cyclohexenol, and polyhydric alcohols such as ethylene glycol, propylene glycol, 1,2-cyclohexanediol, 1,4-cyclohexanediol, glycerine and pentaerythritol.

Examples of the phenols to be used in this invention are phenol, o-cresol, m-cresol, p-cresol, α-naphthol, β-naphthol, hydroquinone, pyrocatechol, resorcin, pyrogallol, 1,2-naphthalenediol, 1,4-naphthalenediol and 9,10-anthracenediol.

It is preferable that as the acrylonitrile, one containing a small amount of a polymerisation inhibitor such as ammonia hydroquinone and methoxyphenol be used.

The composition of the reaction mixture may be optional, but usually, it is preferable to use acrylonitrile in an amount in excess of an iron carbonyl. Ordinarily, 0.01 to 0.5 mole of an iron carbonyl is used per mole of acrylonitrile. An amount less than 0.01 mole causes too low a conversion ratio, and an amount above 0.5 will involve contamination of the wall of a reaction vessel and the interference of a light transmission. An amount of a hydroxy compound should be sufficient. It is preferable to use it in an amount sufficient to give at least 0.5 mole equivalent of OH group per mole of an iron carbonyl compound.

The wavelength of the light used for irradiation mainly ranges 2000 A. to 7000 A., and a high pressure mercury lamp, super high pressure mercury lamp, low pressure mercury lamp, fluorescent lamp, xenone lamp and sun light are used as a light source. It is preferred that irradiation should be carried out in an atmosphere devoid of an oxidizing substance. For this purpose, preferred is an atmosphere of nitrogen, argon, carbon monoxide or carbon dioxide.

In the practice of this invention, an inert organic solvent such as acetonitrile, ethyl acetate, acetone and benzene may be added to increase the solubility of the reactants in one another.

The use of a carbonyl compound of other metal than iron was tried in the process of this invention, but as seen in the examples to be described later, a carbonyl compound of other metal such as nickel and cobalt did not give any satisfactory result.

Adiponitrile obtained according to the process of this invention is hydrogenated to hexamethylene diamine, which is used as an important starting material of nylon 66.

Now, the invention will be described with reference to examples which in no way restrict the invention. All parts used throughout the examples are by weight unless otherwise specified.

EXAMPLES 1-5

A mixture of 80 parts of acrylonitrile, 14 parts of $Fe(CO)_5$ and 2.7 parts of water was subjected to irradiation by a high pressure mercury lamp at 20° C. Reaction took place with the evolution of a gas consisting predominantly of carbon monoxide, and adiponitrile was formed. An irradiation time, an amount of carbon monoxide evolved and a ratio of conversion from acrylonitrile to adiponitrile are shown in Table 1 below.

TABLE 1

| Example: | Irradiation time, minute | Evolved CO/Fe, mole ratio | Conversion ratio, percent |
|---|---|---|---|
| 1 | 25 | 0.5 | 0.14 |
| 2 | 49 | 1.0 | 0.50 |
| 3 | 71 | 1.5 | 0.70 |
| 4 | 124 | 2.0 | 1.00 |
| 5 | 230 | 2.5 | 1.21 |

EXAMPLES 6-10

Examples 1-5 were followed except that 8.2 parts of hydroquinone was used instead of water. Results are shown in Table 2 below.

TABLE 2

| | Irradiation time, minute | Evolved CO/Fe, mole ratio | Conversion ratio, percent |
|---|---|---|---|
| 6 | 25 | 0.5 | 2 |
| 7 | 50 | 1.0 | 0.20 |
| 8 | 75 | 1.5 | 0.44 |
| 9 | 125 | 2.0 | 1.38 |
| 10 | 250 | 2.5 | 3.17 |

EXAMPLES 11-15

A mixture having the same composition as in Examples 1-5 was subjected to irradiation in a sealed vessel purged with nitrogen by means of a high pressure mercury lamp for 3 hours at a temperature indicated in Table 3. There was no appreciable formation of by-products such as propionitrile and a high polymer. A conversion of acrylonitrile to adiponitrile is shown in Table 3. The unreacted acrylonitrile was quantitatively determined, and after taking it together with the formed adiponitrile, the material balance was calculated. It was 100% within a range of experimental accuracy, which showed that there was no formation of by-products.

TABLE 3

| Example: | Temperature, °C. | Conversion ratio, percent | Material balance, percent |
|---|---|---|---|
| 11 | 20 | 1.34 | 100.6 |
| 12 | 40 | 2.02 | 100.8 |
| 13 | 60 | 2.85 | 99.1 |
| 14 | 95 | 4.95 | 99.3 |
| 15 | 110 | 5.75 | 99.5 |

EXAMPLE 16

When a mixture having the same composition as in Example 15 was heated, without irradiation, for 7 hours at 110° C. in a sealed vessel purged with nitrogen, there was no formation of adiponitrile.

EXAMPLE 17

For comparison with Example 15, a mixture of 80 parts of acrylonitrile, 14 parts of $Fe(CO)_5$, 12 parts of water, 6 parts of NaOH and 0.5 part of hydroquinone was heated for 7 hours at 110° C. in a sealed vessel purged with nitrogen. As a result, 5.9% of acrylonitrile was converted into adiponitrile, but many by-products were formed at the same time as shown below (percentages are based on the fed acrylonitrile). Propionitrile 3.2%, ethylene cyanohydrin 4.2%, 2-methyl glutaronitrile 0.8%, bis(2-cyanoethyl) ether 7.0% and a solid high polymer 6.3%. Hence, the yield of adiponitrile based on the consumed acrylonitrile was 22%.

EXAMPLE 18

When Example 15 was followed except that nickel carbonyl was used instead of $Fe(CO)_5$, there was no formation of adiponitrile.

EXAMPLE 19

When Example 15 was followed except that dicobalt octacarbonyl was used instead of $Fe(CO)_5$, there was no formation of adiponitrile, most of the acrylonitrile having been converted into a solid polymer.

EXAMPLES 20-23

Example 14 was followed except that other hydroxy compound was used instead of water. Results are shown in Table 4.

TABLE 4

| Example: | Hydroxy compound | Conversion ratio, percent |
|---|---|---|
| 20 | Hydroquinone (8.2 parts) | 5.2 |
| 21 | Ethanol (16 parts) | 5.2 |
| 22 | Ethylene glycol (16 parts) | 4.3 |
| 23 | Phenol (15 parts) | 4.4 |

EXAMPLE 24

A mixture having the same composition as in Examples 1-5 was subjected to irradiation by a high pressure mercury lamp for 2 hours at room temperature in an atmosphere of nitrogen. It was then transferred to a pressure vessel purged with carbon monoxide, and heated for 4 hours at 110° C. There was formed 5.6 parts of adiponitrile. As a byproduct, only 0.02 part of propionitrile was formed, and there was no other by-product. The unreacted acrylonitrile was determined to be 75.0 parts, which substantiated that there was no other by-product formed. Hence, a ratio of conversion from acrylonitrile to adiponitrile was 6.9%, and the yield of adiponitrile based on the consumed acrylonitrile was 99.6%.

EXAMPLES 25-28

A mixture having the same composition as in Example 24 was subjected to irradiation under the same conditions, and heated for one hour. The heating temperature and the ratio of conversion from acrylonitrile to adiponitrile are shown in Table 5.

TABLE 5

| Example: | Heating temperature, °C. | Conversion ratio, percent |
|---|---|---|
| 25 | 50 | 1.20 |
| 26 | 80 | 2.45 |
| 27 | 110 | 4.97 |
| 28 | 140 | 7.31 |

EXAMPLES 29-36

Example 24 was followed except that other hydroxy compound was used instead of water and heating was done for one hour. Results are shown in Table 6.

TABLE 6

| Example | Hydroxy compound | Conversion ratio, percent |
|---|---|---|
| 29 | Methanol (16 parts) | 8.95 |
| 30 | Ethanol (16 parts) | 7.26 |
| 31 | Isopropanol (16 parts) | 6.48 |
| 32 | Tert.-butanol (16 parts) | 3.30 |
| 33 | Ethylene glycol (16 parts) | 5.63 |
| 34 | Phenol (15 parts) | 4.57 |
| 35 | Hydroquinone (8.2 parts) | 7.42 |
| 36 | Pyrogallol (9.4 parts) | 5.48 |

EXAMPLE 37

A mixture of 80 parts of acrylonitrile, 13.6 parts of diiron eneacarbonyl and 2.7 parts of water was put into a pressure vessel purged with nitrogen, and was subjected to irradiation for 4 hours at 100° C. by means of a high pressure mercury lamp. The ratio of conversion from acrylonitrile into adiponitrile was 6.7%.

EXAMPLE 38

A mixture of 80 parts of acrylonitrile and 14 parts of iron pentacarbonyl was subjected to irradiation for 2 hours at room temperature in an atmosphere of nitrogen by means of a high pressure mercury lamp. Subsequently, on addition of 2.7 parts of water, the mixture was heated to 110° C. for 4 hours in a pressure vessel purged with nitrogen. The ratio of conversion from acrylonitrile to adiponitrile was 7.18%. As 92.8% of the acrylonitrile remained unreacted, the balance of acrylonitrile was 100%, which substantiated that there was no formation of by-products.

EXAMPLE 39

Example 38 was followed except that 8.2 parts of hydroquinone was used instead of water and heating was done for one hour. The ratio of conversion from acrylonitrile to adiponitrile was 4.9%.

EXAMPLE 40

Example 39 was followed except that 16 parts of ethanol was used instead of hydroquinone. The ratio of conversion from acrylonitrile to adiponitrile was 5.2%.

We claim:
1. A process for the manufacture of adiponitrile, which comprises subjecting acrylonitrile and an iron carbonyl compound to irradiation containing a major portion of its energy in wavelengths between 2000 A. to 7000 A., and reacting the mixture with at least one hydroxy compound selected from the group consisting of water, alcohols and phenols.

2. The process according to claim 1 wherein the said hydroxy compound is present in the reaction mixture from the beginning of the reaction.

3. The process according to claim 1 wherein the irradiation is carried out at ambient temperature and the resulting mixture is heated to a temperature of 40 to 200° C.

4. The process according to claim 1 wherein the process is carried out in a substantial absence of oxygen.

5. The process according to claim 1 wherein 0.01 to 0.5 mole of the iron carbonyl compound is used per mole of acrylonitrile.

6. The process according to claim 1 wherein the iron carbonyl compound is iron pentacarbonyl.

7. The process according to claim 1 wherein the hydroxy compound is selected from the group consisting of water, hydroquinone, methanol, ethanol, isopropanol, and phenol.

References Cited

UNITED STATES PATENTS 3,193,480   7/1965   Baizer et al. _____ 204—73

HOWARD S. WILLIAMS, Primary Examiner